United States Patent [19]

Tan et al.

[11] Patent Number: 4,664,419
[45] Date of Patent: May 12, 1987

[54] RETRACTABLE FLOW LINE CONNECTOR

[75] Inventors: Kee H. Tan, Cambridge, Mass.; William R. Sherlock, Devon, England

[73] Assignee: Shell Oil Company, Houston, Tex.

[21] Appl. No.: 640,634

[22] Filed: Aug. 15, 1984

[30] Foreign Application Priority Data

Aug. 17, 1983 [GB] United Kingdom ............... 8322143

[51] Int. Cl.4 ............................................. F16L 21/00
[52] U.S. Cl. ...................................... 285/31; 285/132; 285/223; 285/315; 285/320; 285/364; 285/371; 285/920
[58] Field of Search ................. 285/18, 164, 223, 224, 285/225, 226, 234, 235, 920, 132, 298, 299, 371, 24, 27, 315, 31, 320, 166, 364

[56] References Cited

U.S. PATENT DOCUMENTS

| 2,419,750 | 4/1947 | Wiberg | 285/225 |
| 3,490,792 | 1/1970 | Piegza | 285/299 X |
| 3,554,579 | 1/1971 | Brown | 285/18 |
| 4,173,360 | 11/1979 | Bergman | 285/223 X |
| 4,270,775 | 1/1981 | Noensie et al. | 285/235 |
| 4,337,971 | 7/1982 | Kendrick | 285/315 |
| 4,477,105 | 10/1984 | Wittman | 285/DIG. 21 X |

FOREIGN PATENT DOCUMENTS

| 1289408 | 9/1972 | United Kingdom . |
| 1295686 | 11/1972 | United Kingdom . |
| 2055165A | 2/1981 | United Kingdom . |
| 2074687 | 11/1981 | United Kingdom | 285/223 |

Primary Examiner—Dave W. Arola

[57] ABSTRACT

The invention relates to a retractable connector for interconnecting the ends of two flow lines in a releasable manner.

5 Claims, 7 Drawing Figures

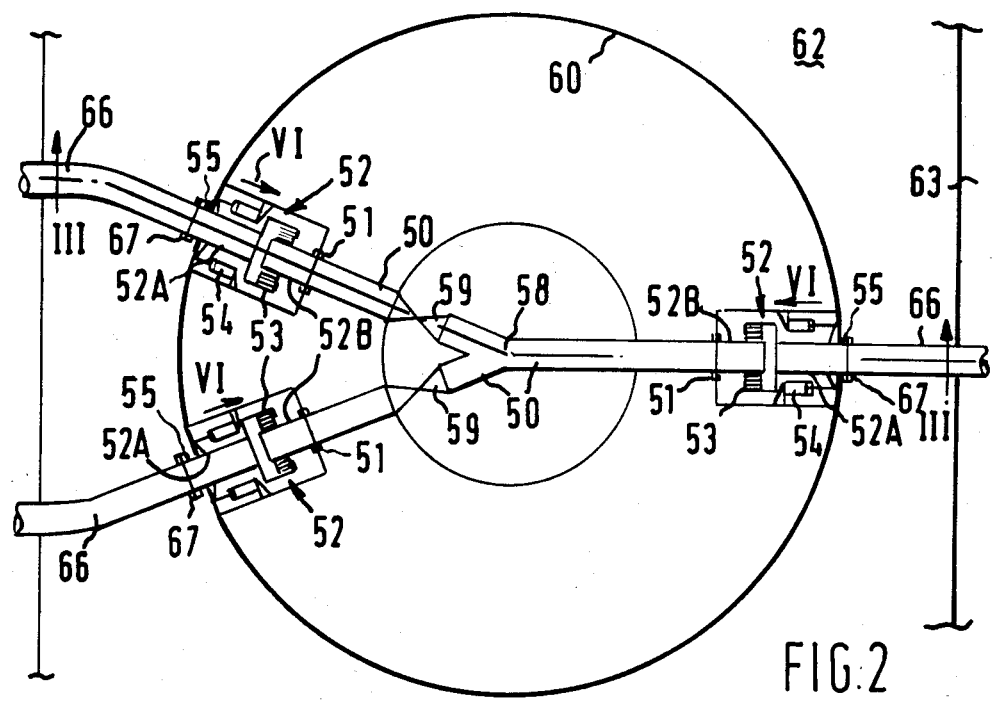
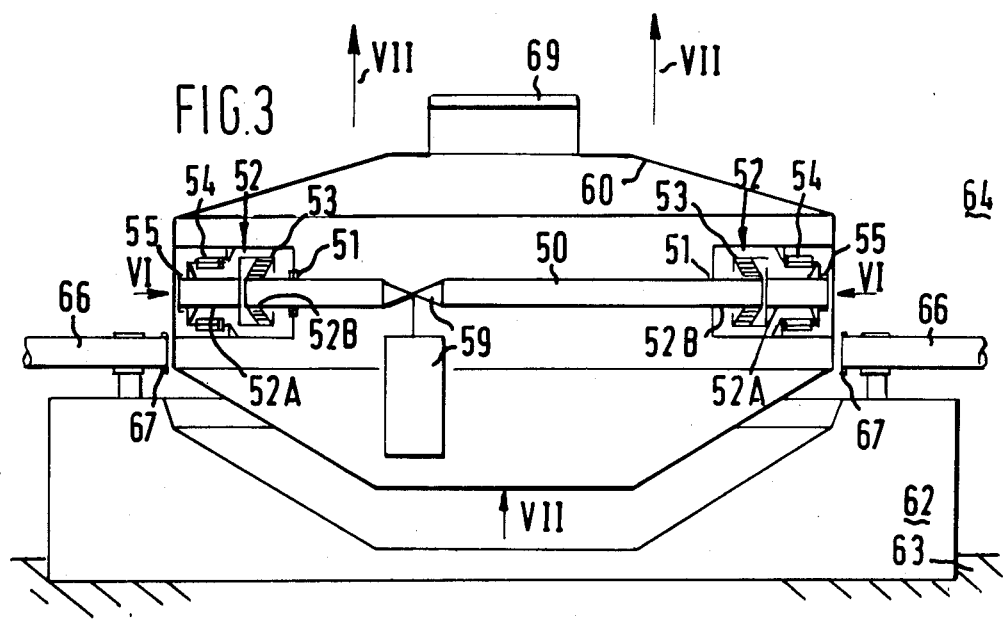
FIG.2
FIG.3

RETRACTABLE FLOW LINE CONNECTOR

BACKGROUND OF THE INVENTION

In the petroleum industry and particularly in offshore oil and gas production operations it is often required to provide non-retrievable submarine pipelines with sections that can be easily retrieved to the water surface. The retrievable sections generally comprise wear prone components that require regular replacement or abovewater inspection, such as valves and measuring and control equipment.

Various connector systems suitable for connecting such retrievable pipe sections to non-retrievable pipelines in a releasable manner are currently being used.

U.K. patent application No. 2,081,831 discloses a releasable flow line connector provided at one end thereof with a quick-release coupling that includes an assembly of pivotable latching fingers which are actuated to pivot by means of a slidable ring. U.S. Pat. No. 3,554,579 discloses a releasable connector provided with a quick-release coupling similar to the above coupling. This flow line connector is moreover retractable since it consists of two telescoping members. The fluid conduits passing through the connector are intercoupled by means of telescoping conduit sections, wherein the annular space between these sections is sealed off by flexible O-rings. These rings can easily be damaged when sliding the sections relative to each other.

A major disadvantage of both known connectors is that a slight misalignment of the flow line ends that are to be interconnected thereby cannot be compensated and will lead to an unreliable connection.

SUMMARY OF THE INVENTION

An object of the present invention is to provide a retractable flow line connector which is capable to interconnect two flow line ends in a reliable manner, even in case the interconnected flow line ends are misaligned.

This object is accomplished in accordance with the invention by a retractable connector comprising a pair of substantially coaxial tubular members, each member being provided at one end thereof with coupling means for coupling the connector in fluid communication with one of the flow lines, the members being connected at the other ends thereof in fluid communication with each other by means of a flexible joint, the joint interconnecting the tubular members in a manner allowing at least an axial displacement of the members relative to each other. The connector further comprises actuator means for inducing said axial displacement.

In an attractive embodiment of the invention the joint comprises a pipe segment rigidly connected to one of the tubular members and coaxially arranged to the other tubular member with an annular space therebetween, the joint further including a flexible annular element being arranged between and interconnecting the pipe segment and said other tubular member.

In another attractive embodiment of the invention the joint comprises a pipe segment coaxially arranged to both tubular members, thereby forming an annular space between the pipe segment and each of the members, the joint further including a pair of flexible annular elements being arranged between and interconnecting the segment and the members.

In a suitable embodiment of the invention the connector comprises a first and a second tubular member, the first member being suitable to be releasably coupled to an end of a non-retrievable submarine flow line, the second member being coupled to an end of a fluid conduit system which is adapted to be retrieved to the water surface.

BRIEF DESCRIPTION OF THE DRAWINGS

In the following part of the description the invention will be explained by way of example in more detail with reference to the accompanying drawings, in which:

in FIG. 1A the upper half of the connector is shown in the extended position thereof, and in FIG. 1B the lower half of the connector is shown in the retracted position thereof.

FIG. 2 is a top view of a horizontal cross section of a retrievable conduit system provided at each end thereof with a retractable flow line connector according to the invention, the system intercoupling the ends of a plurality of submarine flow lines.

FIG. 3 is a cross section taken along line III—III of the conduit system of FIG. 2, after disconnection thereof from the submarine flow lines.

in FIG. 4A the upper half of this connector is shown in the extended position thereof, and in FIG. 4B the lower connector half is shown in the retracted position thereof.

DESCRIPTION OF PREFERRED EMBODIMENTS

Figure 1:
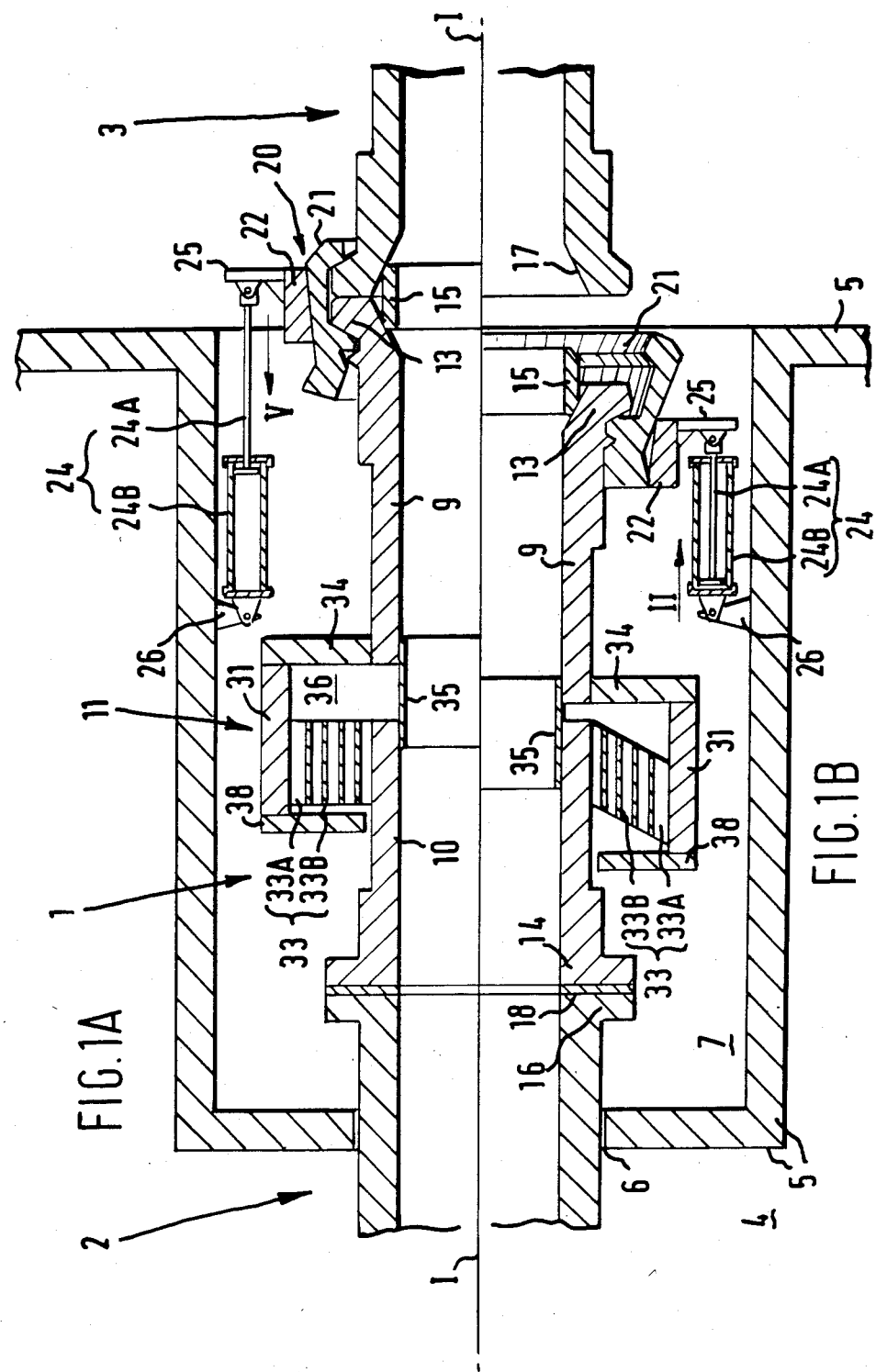
FIG. 1 is a longitudinal sectional view of a retractable flow line connector embodying the invention.

FIG. 1 shows a retractable flow line connector 1 being arranged between the ends of a first and a second flow line 2 and 3, respectively. The first flow line 2 is arranged in the interior 4 of a housing 5 and extends through a port 6 in the housing wall, the second flow line 3 is arranged outside the housing 5, whereas the connector 1 is arranged in a cylindrical recess 7 of the housing 5.

The retractable connector 1 comprises a first tubular member 9 and a second tubular member 10, both members being coaxial to a central axis I—I. The tubular members 9 and 10 are at one end thereof connected to each other by means of a flexible joint 11. The other ends of the members 9 and 10 form the first and second terminal flanges 13 and 14, respectively, of the connector 1.

The second terminal flange 14 is secured to a flange 16 at the end of the first flow line 2 by means of nuts and bolts (not shown). Sealing between the flanges 14 and 16 is provided by a sealing ring 18.

The first terminal flange 13 is provided with releasable coupling means 20 for connecting the flange 13 to the flange 17 at the end of flow line 3 in a releasable manner. The flange 13 carries further a metal sealing ring 15 for providing a fluid tight connection between the flanges 13 and 17. The releasable coupling means 20 comprise a plurality of axially extending pivotable latching fingers 21 and a biasing ring 22 surrounding the fingers 21. The latching fingers 21 are actuated to pivot by sliding the biasing ring 22 between a first position (see FIG. 1A) in which the ring biases the fingers 21 into engagement with the flanges 13 and 17, and a second position (see FIG. 1B) in which the ring 22 lifts the fingers 21 from the flanges 13 and 17. The sliding motion of the ring 22 over the fingers 21 is actuated by a plurality of piston/cylinder assemblies 24. Each assembly 24 forms part of a hydraulic circuit (not shown) and comprises a piston 24A and a cylinder 24B. Each piston 24A is connected to a stud 25 mounted on the biasing ring 22 and each cylinder 24B is connected to a stud 26 that is secured to the wall 5 of the recess 7.

The flexible joint 11 interconnecting the tubular members 9 and 10 comprises a pipe segment 31 that forms a widened extension of the first tubular member 9 and that is rigidly connected to the first member 9 by means of a disc-shaped plate 34. The pipe segment 31 is arranged coaxially to the second tubular member 10 with an annular space therebetween, in which space a flexible annular element 33 is arranged. The annular element 33 is bonded at the outer contour thereof to the pipe segment 30 and at the inner contour thereof to the tubular member 10. The element 33 interconnects the pipe segment 31 and the second tubular member 10 in a manner allowing axial displacement thereof relative to each other over a predetermined distance. Thereto the element 33 consists of a series of coaxial cylindrical layers 33A of resilient elastomeric material and a series of coaxial cylindrical layers 33B of rigid reinforcement material (e.g. steel), which layers 33A and 33B are alternatingly arranged and bonded together by suitable bonding materials.

A cylindrical dirt cover sleeve 35 is secured at one end thereof to the inner surface of the first tubular member 9 in such a manner that the sleeve 35 bridges the open space 36 between the tubular members 9 and 10. The other end of the sleeve 35 is slidably arranged in the second member 10 thereby preventing solid particles that may be present in the fluid flow through the interior of the connector 1 to enter the space 36. The joint 11 is further provided with a terminal disc 38 which is secured to an end of the pipe segment 31 at a small distance from the flexible element 33 to prevent excessive deformation of the element 33 due to pressure surges in the fluid flow through the connector 1.

The procedure for coupling the connector 1 to the second flow line 3 is as follows. First the connector 1 is in the retracted position thereof (see FIG. 1B) maneuvered in a position in which the first terminal flange 13 faces the flange 17 of flow line 3. When the connector 1 is in the retracted position the resilient layers 33A of the flexible joint 33 are subject to shearing stress and as a result of the resilient deformation of these layers 33A an axial force is generated forcing the first tubular element 9 towards the extended position thereof (as shown in FIG. 1A). Due to this axial force the latching fingers 21 remain in the expanded position thereof (as shown in FIG. 1B) when the pistons 24A are subsequently activated to axially displace the biasing ring 22 in the direction of arrow II. When, as a result of this axial movement, the terminal flange 13 of the first member 9 engages the flange 17 of flow line 3 the movement of this member 9 is stopped. The stroke of the pistons 24A is longer than the axial distance over which the first member 9 is to be displaced, consequently the pistons 24A proceed to displace the biasing ring 22 in the direction of arrow II. The ring 22 subsequently slides over the fingers 21 from the position shown in FIG. 1B towards the position shown in FIG. 1A, thereby causing the latching fingers 21 to pivot such that they are brought into engagement with the flanges 13 and 17. After carrying out the above coupling procedure the flange 13 of the connector 1 is joined to flange 17 of the flow line 3 in a fluid tight manner.

The procedure for releasing the coupling means 20 and for retracting the connector 1 is carried out by actuating the pistons 24A to move the biasing ring 22 in the direction of arrow V. This movement causes, since the fingers 21 are still latched to the flanges 13 and 17 (see FIG. 1A), the ring 22 to slide over the fingers 21, thereby pivoting the fingers 21 towards the expanded position thereof, in which position the fingers 21 are lifted from the flanges 13 and 17. By continuing the axial movement of the ring 22 in the direction of arrow V after release of the fingers 21 from the flanges 13 and 17 the first member 9 of the connector 1 moves together with the ring 22 towards the retracted position thereof as shown in FIG. 1B.

Since the art of providing a releasable coupling between two adjoining flanges by means of latching fingers that are pivoted by means of a biasing ring is known per se, no further details on the design of the releasable coupling are given in this specification. It will be appreciated that instead of the releasable coupling 20 shown in FIG. 1 any other type of releasable coupling known in the art is suitable for the purpose.

The main advantages of the retractable flow line connector shown in FIG. 1 over the prior art retractable connectors are that the flexible joint 11 provides a reliable and leakage free connection between the two connector members 9 and 10 and that the flexibility of the elastomeric layers 33A of the joint 11 allows the central axis of the first tubular member 9 to deviate within certain limits from the central axis of the second tubular member 10, such that in case the flow lines 2 and 3 are misaligned the connector still provides a leakage free connection between these flow lines.

FIGS. 2 and 3 show a retrievable conduit system 50 for interconnecting a plurality of submarine flow lines 66. The conduit system 50 is arranged in a submerged housing 60 and is provided at each end 51 thereof with a retractable connector 52. The connectors 52, although shown in less detail, are similar to the flow line connector 1 shown in FIG. 1.

Each connector 52 comprises a first tubular member 52A and a second tubular member 52B and a flexible joint 53 interconnecting the members 52A and 52B. Each connector 52 is provided with hydraulically actuated piston means 54 for axially displacing the first member 52A relative to the second member 52B and with releasable coupling means (not shown) at the terminal flange 55 of the first member 52A.

In the situation shown in FIG. 2 the housing 60 is retrievably mounted on a submarine base 62 which is placed on the bottom 63 of a body of water 64 (see also FIG. 3). The base carries three non-retrievable submarine flow lines 66, each of the flow lines 66 being provided at one end thereof with a flange 67. Each of these flanges 67 is releasably coupled to a terminal flange 55 of a connector 52.

In this manner each of the conduits of the conduit system 50 in the housing 60 is connected in fluid communication with one of the non-retrievable submarine flow lines 66 by means of a retractable connector 52.

The conduit system 50 in the housing 60 comprises various wear and obstruction sensitive components such as a manifold 58, valves 59, and measuring and control equipment (not shown). Such components require regular inspection or replacement thereof. If inspection or replacement is required the housing 60 is lifted from the submarine base 62 by the following procedure. First the piston means 54 are actuated to be axially displaced in the direction of arrows VI so as to release the coupling means (not shown) and to retract the connector 52 such that the terminal flanges 55 of the connectors 52 are axially displaced from the flanges 67. With the connectors 52 in the retracted position thereof (see FIG. 3) the housing 60 is lifted from the base in a vertical direction (see arrows VII) and retrieved to the water surface by means of either hoisting means (not shown) or a self-propelled submarine vessel (not shown). After the housing 60 has been recovered at a surface vessel (not shown), service men may enter the housing 60 through a sealable manhole (not shown) in order to repair or replace the above-mentioned components in case of failure thereof. Reinstallation of the housing 60 after inspection thereof on the submarine base 62 is carried out by applying the above procedure in a reverse manner.

It will be appreciated that instead of reinstalling the housing after repair, the housing may also be replaced by a substitution housing which is identical to the housing that is to be repaired. In this way down-time due to repair can be reduced to a minimum.

It will further be appreciated that in case a large amount of flow lines are to be interconnected a series of retrievable housings may be arranged on a submarine base, which housings are each provided with a conduit system in the interior thereof, the conduit systems terminating at each end in a flow line connector shown in FIGS. 1A and 1B. In this manner complicated non-retrievable submarine flow line systems can be provided with easily retrievable conduit sections comprising wear sensitive components, which conduit sections provide a reliable and leakage free communication between the various non-retrievable parts of the submarine flow line system.

It will be understood that particularly in submarine operations it is desirable to provide reliable and leakage free communications between various flow lines, even in case these flow lines are misaligned with respect to the planned orientation thereof since extensive realignment procedures are to be carried out to readjust the position of such flow lines.

Figure 4:
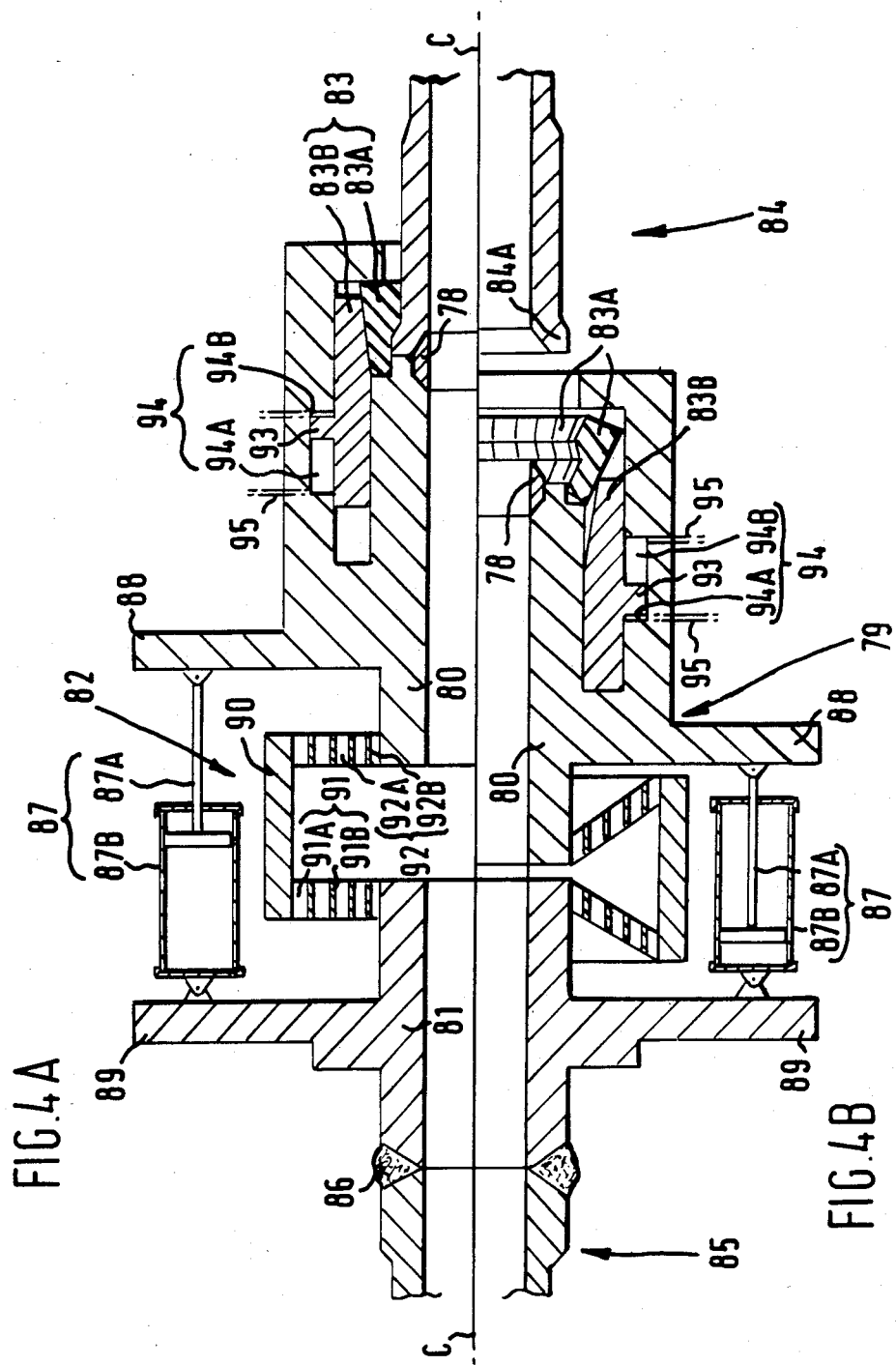
FIG. 4 is a longitudinal sectional view o another retractable connector embodying the invention.

In case a large misalignment of the interconnected flow lines is foreseen or in case it is required that the connector is retractable over a long axial distance then the retractable flow line connector 79 shown in FIG. 4 is applied, which connector 79 has a "double" axial and angular flexibility in comparison to the connector 1 of FIG. 1. The connector 79 comprises a first and a second tubular member 80 and 81, respectively, which members 80 and 81 are coaxial to a central axis C—C. The members 80, 81 are at one end thereof interconnected by means of a flexible joint 82. The other end of the first member 80 is provided with a metal sealing ring 78 and with releasable coupling means 83 for coupling the connector 79 in a releasable manner to a first flow line 84, whereas the other end of the second member 81 is rigidly coupled to a second flow line 85 by a weld 86.

The connector 79 is provided with a plurality of hydraulic piston/cylinder assemblies 87A, 87B for axially displacing the first member 80 relative to the second member 81 from an extended position (see FIG. 4A) to a retracted position (see FIG. 4B) and vice versa. Each assembly 87 is connected at one end thereof to a flange 88 forming part of the first member 80 and at the other end thereof to a flange 89 forming part of the second member 81.

The flexible joint 82 comprises a pipe segment 90, coaxially arranged to the tubular members 80, 81, thereby forming an annular space between the pipe segment 90 and each of the members 80, 81. The joint 82 further includes a pair of flexible annular elements 91, 92, which elements 91, 92 are arranged in the two annular spaces thus created between the pipe segment 90 and the members 80, 81. The annular elements 91, 92 are both at the outer contour thereof bonded to the pipe segment 90. The element 91 is at the inner contour thereof bonded to the first member 80, whereas the other element 92 is bonded at the inner contour thereof to the second member 81. Each element 91, 92 consists of a series of coaxial cylindrical layers 91A, 92A of resilient elastomeric material and a series of coaxial cylindrical layers 91B, 92B of rigid reinforcement material (e.g. steel), which resilient and rigid layers are alternatingly arranged and bonded together by suitable bonding materials.

The releasable coupling means 83 for coupling the connector 79 to the flow line 84 include a plurality of pivotable latching fingers 83A and a biasing ring 83B having at one end thereof an inwardly tapered surface cooperating with the fingers 83A. The biasing ring 83B is provided with a collar 93 that divides an annular space 94 formed in the member 80 in two annular chambers 94A, 94B. The annular chambers 94A, 94B form part of a hydraulic circuit 95, and by creating a pressure difference between said chambers the biasing ring 83B can be activated to be axially displaced relative to the member 80. The latching fingers 83A are provided with spring means (not shown) forcing the fingers 83A towards the expanded position thereof (as shown in FIG. 4B).

The procedure for coupling the connector 79 to the flow line 84 is as follows. The connector is arranged coaxially to the flow line 84 in the position shown in FIG. 4B with the hydraulic pistons 87A in the retracted position. Subsequently, the connector 79 is brought to the extended position (see FIG. 4A) by expanding the hydraulic piston/cylinder assemblies 87. As a result of the extension of the connector 79 the sealing ring 78 is pressed into a frusto-conical part of a flange 84A at the end of the flow line 84, thereby providing a fluid-tight seal between the connector 79 and the flange 84A. The coupling procedure is completed by activating the biasing ring 83B to slide from the position shown in FIG. 4B to the position shown in FIG. 4A, thereby causing the fingers 83A to pivot such that they are brought into engagement with the flange 84A.

It will be appreciated that the major difference between the connector of FIG. 4 and the connector of FIG. 1 lies in the arrangement of two flexible elements in the joint instead of a single element only. The "double" arrangement of the flexible elements in the joint of FIG. 4 allows the tubular members to be displaced relative to each other over an enlarged axial distance. This arrangement further allows an enlarged misalignment of the tubular members that can be accepted without the risk of impairing the reliability of the connector. If desired the axial distance over which the tubular members can be displaced relative to each other can be further enlarged by arranging a third tubular member between the first and second tubular members and by connecting each end of this third member to a corresponding end of one of the other members by means of a flexible joint as shown in FIG. 4.

Sometimes the interconnected flow lines 84, 85 are misaligned to such a large extent, that when using the connector 79, the flexible joint 82 thereof is to be pivoted over such a wide angle that the rather fragile resilient layers 91–92A may become subject to high stresses. In case of such large misalignment of the flow lines, the occurrence of high stresses in the resilient layers of the joint can be avoided by replacing the flexible joint 82 by the flexible joint 100 of FIG. 5.

Figure 5:
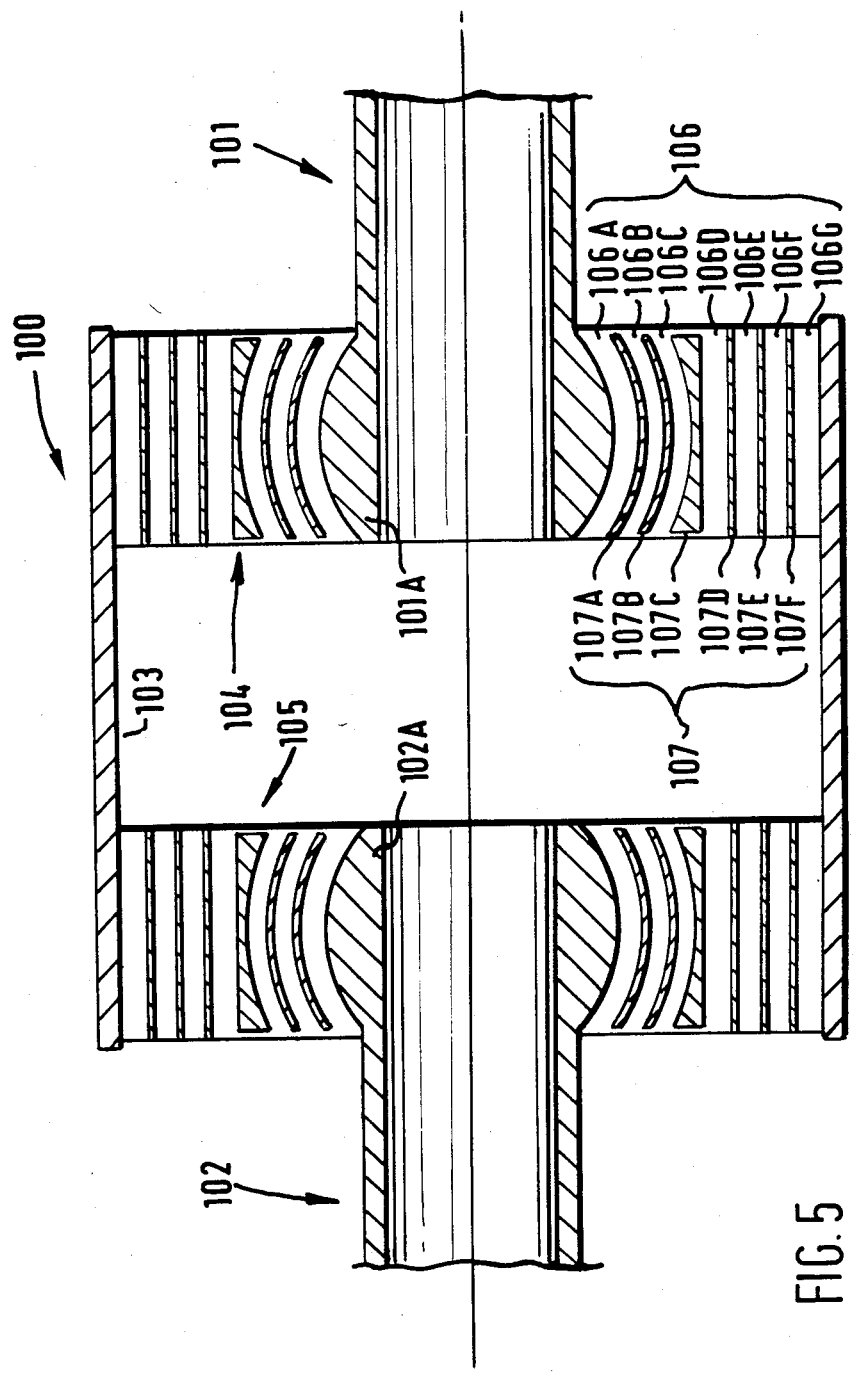
FIG. 5 shows in detail a flexible joint forming part of a connector according to the invention.

The flexible joint 100 shown in FIG. 5 interconnects a pair of tubular members 101, 102 of a retractable connector which is—except the use of an alternative joint—similar to the connector 79 shown in FIG. 4.

The joint 100 comprises a pipe segment 103 and a pair of flexible annular elements 104, 105. The pipe segment is coaxial to the tubular members 101, 102 and surrounds the spherical surfaces of ball-shaped end sections 101A, 102A of the members 101, 102. The elements 104 and 105 are arranged in the two annular spaces created between the segment 103 and the member sections 101A and 102A. The elements 104, 105 are identical and therefore only the construction of element 104 will be described in detail hereinbelow.

The element 104 consists of a series of layers 106 of resilient elastomeric material and a series of layers 107 of rigid reinforcement material. The layers 106 and 107 are alternatingly arranged and the sequence of these layers is such that six concentric rigid layers 107A-F and seven concentric flexible layers 106A-G are present. The three outer rigid layers 107D-F are cylindrically shaped, the two inner rigid layers 107A-B have a spherical shape, whereas the intermediate rigid layer 107C has a cylindrical outer surface and a spherical inner surface. The outer surface of said layer 107C and the cylindrical layers 107D-F are coaxial to the pipe segment 103, whereas the inner surface of said layer 107C and the spherical layers 107A-B are concentric to the spherical outer surface of member section 101A. In this manner three spherically shaped resilient layers 106A-C and four cylindrically shaped resilient layers 106D-G are created.

The pairs of adjoining rigid and resilient layers are bonded together, the innermost resilient layer 106A is bonded at the inner surface thereof to the spherical outer surface of member section 101A, and the outermost resilient layer 106G is bonded at the outer surface thereof to the inner surface of pipe segment 103.

The arrangement in the flexible element 104 of a sequence of spherical and cylindrical layers 106 of resilient material provides an element allowing axial displacement as well as angular deflection of the segment 103 relative to the member 101. When the segment 103 is axially displaced relative to the member 101 particularly the cylindrical resilient layers 106D-G are subject to shearing stress, and in case the segment 103 and the member 101 are pivoted relative to each other particularly the spherical resilient layers 106A-C are subject to shearing stress.

It will be appreciated that the arrangement of spherical and cylindrical resilient layers in both flexible elements 104 and 105 provides a joint 100 interconnecting the members 101, 102 in a manner allowing axial and radial displacement as well as angular deflection of the members relative to each other. Therefore, the joint 100 is particularly suitable for use in a retractable connector for interconnecting the ends of flow lines that are both angularly and axially misaligned.

It will be understood that in case the flow line connector according to the invention is used in a flow line system where during operation only a moderate pressure difference exists between the interior and exterior thereof reinforcement of the flexible elements is not required. Therefore, the arrangement of the rigid reinforcement layers in the flexible elements of FIGS. 1–5 is optional, provided that the connector is used in a low pressure flow line system.

It will further be appreciated that the flow line connector according to the invention is suitable for interconnecting all kinds of flow lines of any length or shape, such as conduits having different bores, flexible conduits, rigid pipelines, etc.

What is claimed is:

1. A retractable connector for releasably interconnecting the ends of two flow lines, comprising first and second substantially coaxial tubular members, each member being provided at one end thereof with coupling means for coupling the connector in fluid communication with one of the flow lines, the members being connected at the other ends thereof in fluid communication with each other by means of a flexible joint, the joint interconnecting the tubular members in a manner allowing at least an axial displacement of the members relative to each other, the joint comprising a pipe segment coaxially arranged to both tubular members, thereby forming an annular space between the segment and each of the members, the joint further including a pair of flexible annular elements being arranged between and interconnecting the segment and the members, with each flexible element comprising alternatingly arranged concentric layers of resilient and rigid material, said layers being bonded together and at least one of said resilient layers being cylindrically shaped, and at least one of said resilient layers being spherically shaped, the first tubular member being adapted to be releasably coupled to an end of a submarine flow line by said coupling means, the second tubular member being coupled to an end of a conduit system which is adapted to be retrieved to the water surface along with said first and second tubular members, the conduit system releasably interconnecting the ends of a plurality of submarine flow lines in fluid communication with each other, each end of said system being coupled to the second member of a retractable flow line connector, a conduit system and said first and second tubular members being arranged in a housing which is adapted to be arranged on a submarine base.

2. The connector of claim 1, wherein the coupling means of the first member is of the quick-release type and wherein remotely controlled coupling operating means are provided for operating said releasable coupling means.

3. The connector of claim 2, wherein the releasable coupling means comprises a plurality of pivotable latching fingers, each of said fingers being suitable for cooperating with a flange at an adjoining flow line end and a biasing ring being axially slidable over said fingers between a first position in which the ring biases the fingers into engagement with said flange and a second position in which the ring biases the fingers to pivot such that they are lifted from the flange.

4. The connector of claim 3, wherein the coupling operating means comprises a plurality of axially extending hydraulically actuated piston/cylinder assemblies, each assembly being connected at one end thereof to the biasing ring for axially sliding the ring between said first and second position.

5. The connector of claim 4, wherein the other end of each piston/cylinder assembly is connected to the second tubular member, each piston/cylinder assembly having a stroke of a size allowing performance thereof as coupling operating means and as actuator means for axially displacing the first connector member relative to the second member between an extended and a retracted position thereof.

* * * * *